(12) United States Patent
Chun

(10) Patent No.: US 7,688,264 B2
(45) Date of Patent: Mar. 30, 2010

(54) METHOD AND APPARATUS FOR PASSIVE SINGLE PLATFORM GEO-LOCATION

(75) Inventor: Craig C. M. Chun, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 11/945,899

(22) Filed: Nov. 27, 2007

(65) Prior Publication Data

US 2009/0135059 A1 May 28, 2009

(51) Int. Cl.
  *G01S 1/02* (2006.01)
  *G01S 3/02* (2006.01)
(52) U.S. Cl. .................. 342/450; 342/357.09; 342/442
(58) Field of Classification Search ............ 342/357.06, 342/357.09, 387, 393, 394, 450, 457, 463; 455/456.1, 457
See application file for complete search history.

(56) References Cited

U.S. PATENT DOCUMENTS 5,444,451 A    8/1995   Johnson et al. ............. 342/453
5,999,129 A   12/1999   Rose .......................... 342/394
6,407,703 B1   6/2002   Minter et al. ............... 342/450
6,670,920 B1  12/2003   Herrick ...................... 342/378
7,391,355 B2 *  6/2008   Mortimer ..................... 342/13
2007/0049195 A1  3/2007   Chun ......................... 455/3.02
2007/0049204 A1  3/2007   Chun ........................ 455/67.11

* cited by examiner

*Primary Examiner*—Dao L Phan
(74) *Attorney, Agent, or Firm*—Hayes Soloway P.C.

(57) ABSTRACT

The present disclosure provides an RTD that is released from a single primary platform to collect signals from a target emitter and relay data back to a single primary platform, enabling the precise geo-location of the target emitter to be determined in a minimal amount of time. The RTD is released from a single platform and quickly creates a long signal collection baseline between the released RTD and the single platform. Various techniques for determining geo-location may be used with the present disclosure, such as angle of arrival (AOA), time difference of arrival (TDOA), and frequency difference of arrival (FDOA) methods.

20 Claims, 3 Drawing Sheets

PRIOR ART

US 7,688,264 B2

METHOD AND APPARATUS FOR PASSIVE SINGLE PLATFORM GEO-LOCATION

FIELD

The present disclosure relates to a system and method for determining the geographical location of a radio frequency (RF) emitter. The disclosure has particular utility in providing precision geo-location using a receiver/transmitter device (RTD) from a single platform such as an airplane and will be described in connection with such utility, although other utilities are contemplated.

BACKGROUND

There are many circumstances where it is necessary or desirable to determine the geo-location of an RF emitter. Applications include search and rescue (SAR) operations that locate an emergency signal and military signal intelligence operations for locating communications facilities.

Various single platform systems have been developed for determining the geo-location of an RF emitter. While single platform systems are inexpensive when compared to multiple platform systems, single platform systems are incapable of executing a simultaneous, coherent collection of an RF emitter signal. FIG. 1A shows a typical single platform system which triangulates the position of an RF emitter by comparing data points taken at different times ($t_1$, $t_2$) from the same platform $P_1$. A larger baseline, or the distance between the points where the signals are collected, is desirable to increase the accuracy of the system. However, the single platform must travel the distance of the baseline, consuming time to determine the precise geo-location of the target emitter. In instances where the target emitter is mobile, this limitation is critical.

Using a Search And Rescue (SAR) mission as an example, precision single platform geo-location is accomplished by flying from one position to another to triangulate on the RF emitter signal. The time consumed during this process can be fatal when rapid response is required for a life-threatening situation.

Cooperative geo-location systems can quickly triangulate on an RF emitter by comparing simultaneous signals collected from multiple platforms ($P_1$, $P_2$). See FIG. 1B. While these designs are able to minimize the duration of time required for triangulation, multiple platform designs require an increased number of assets and generally require additional coordination efforts, making their implementation cost-prohibitive.

Alternative single platform designs deploy tethered or towed platforms for receiving simultaneous signals. Another solution is to install RTDs at different points on the airplane. These prior art designs operate under a similar principle as other multiple platform designs, collecting simultaneous signals at different angles. Such designs have limited success in determining an azimuth angle, constrained by the length of the cable or of the airplane which limits the baseline. These systems are even less useful for determining an elevation angle because the baseline with respect to elevation is generally limited to the vertical height of a plane. Further, a tethered and towed device will travel at the same velocity as the primary platform and thus is a very poor design for frequency difference of arrival (FDOA) measurements.

Accordingly, there is a need for an improved system for determining the geo-location of an RF emitter with optimal time-response and minimal cost and coordination required.

SUMMARY

To address the requirements described above, the present disclosure is directed to an RTD that is released from a primary platform to collect signals from a target emitter and relay data back to the primary platform, enabling the precise geo-location of the target emitter to be determined in minimum time. The RTD is released from the primary platform and quickly creates a long signal collection baseline between the released RTD and the single platform. Various methods for determining geo-location may be used with the present disclosure including, for example, angle of arrival (AOA), time difference of arrival (TDOA), and frequency difference of arrival (FDOA) methods.

One aspect of the disclosure provides a system for determining the geo-location of a target emitter. The system includes at least one RTD having an antenna for receiving a signal from a target emitter, a tuner for tuning said signal, and processor for processing data from the signal that will be used to determine the geo-location of the target emitter. The RTD also has a transmitter for relaying the processed data to a platform. The platform has a first antenna and tuner for receiving the signal from the target emitter, a second antenna for receiving the processed signal from the at least one RTD, and a processor for calculating the geo-location of the target emitter based on the signals received.

Another aspect of the disclosure provides a method for determining the geo-location of a target emitter using the system described above in which the RTD is released from a primary platform. As the RTD freefalls from the platform, the distance between the RTD and the platform increases rapidly. A signal from the target emitter is received by the RTD and also by an antenna on the platform. The RTD processes the signal and transmits the processed data in another signal to the platform. A processor on the platform processes the signals received from the target emitter and the RTD and calculates the geo-location of the target emitter from this data.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings, wherein like numerals depict like parts, and wherein.

DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope thereof.

Figure 1A:
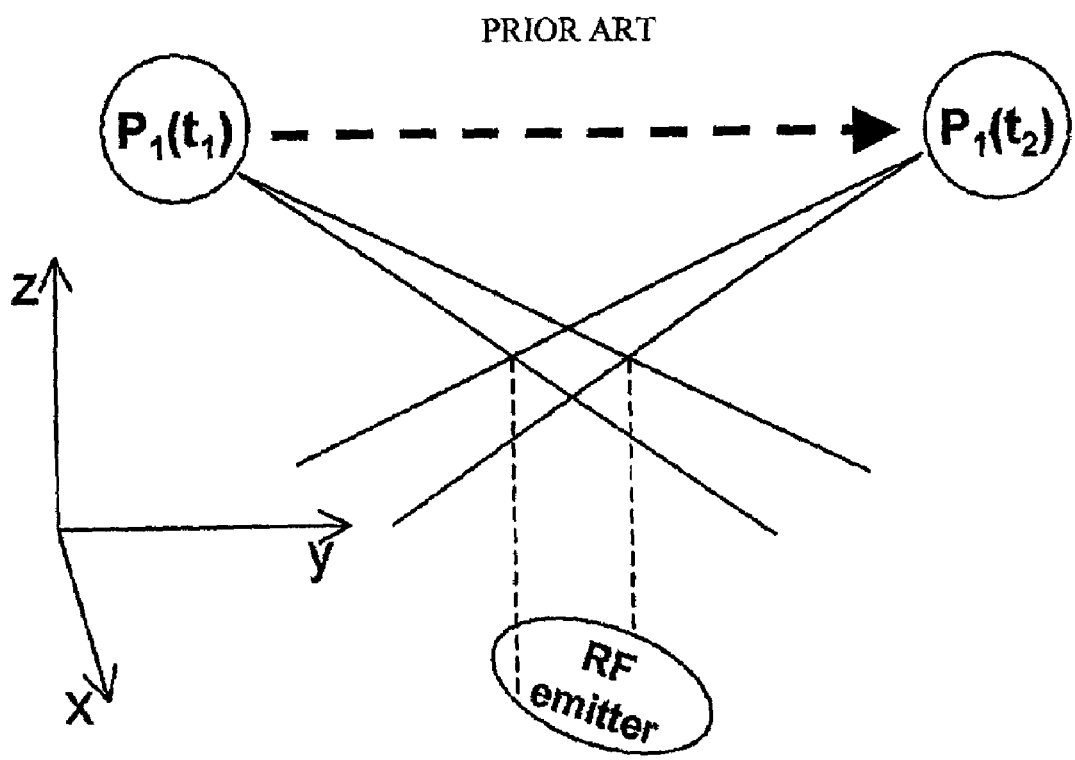
FIGS. 1A and 1B are schematics of single and multiple platform geo-location methods according to the prior art.
Figure 1B:
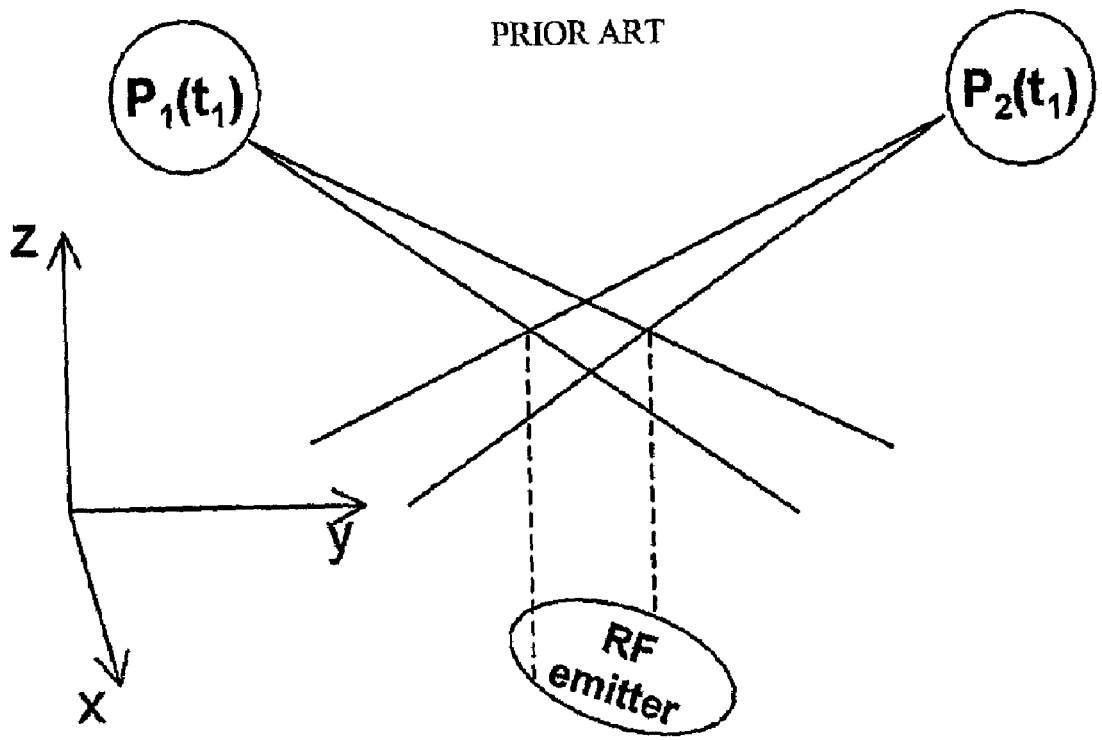
Figure 2:
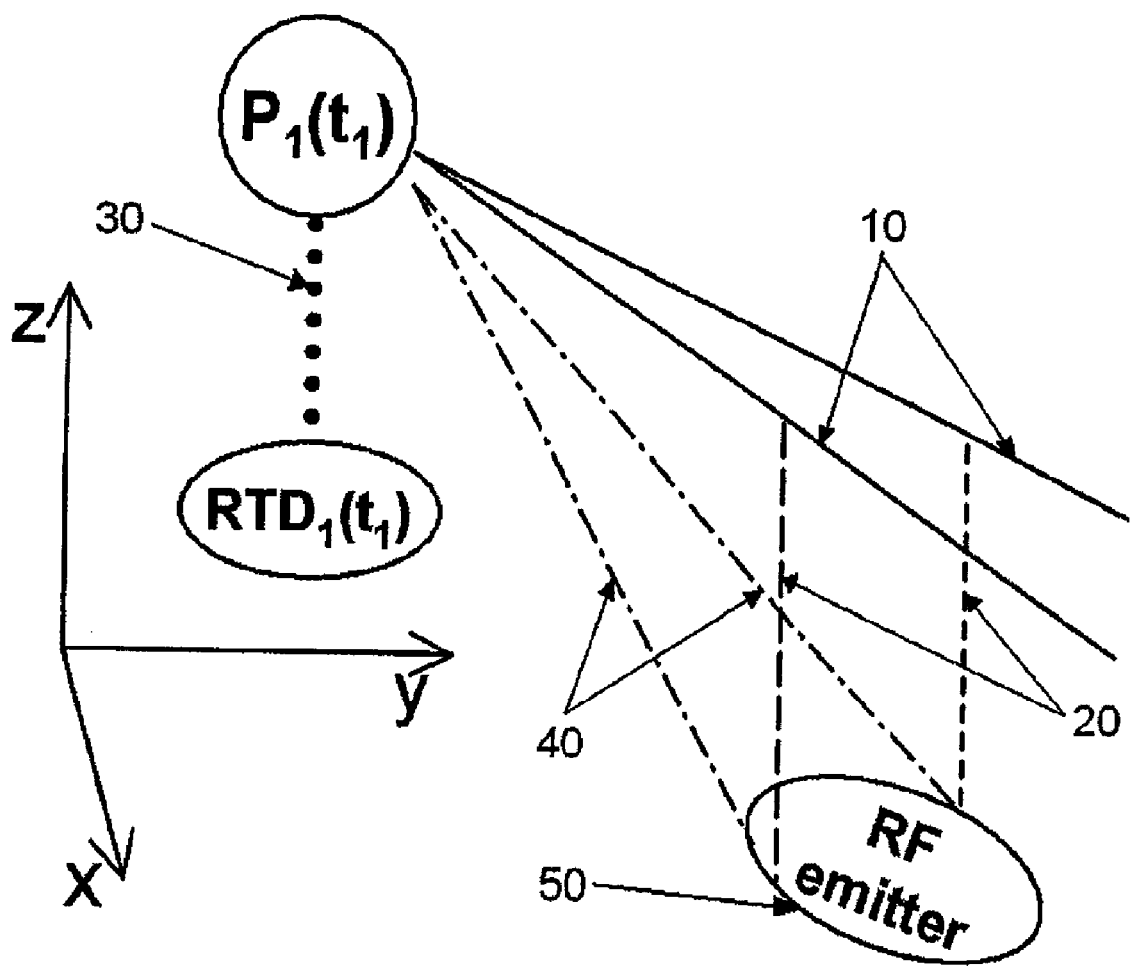
FIG. 2 is a schematic of a single platform geo-location method in accordance with one embodiment of the present disclosure.

FIG. 2 is a schematic of a single platform system for determining geo-location of a radio frequency (RF) emitter in accordance with one embodiment. A receiver/transmitter device ($RTD_1$) is released from a primary platform ($P_1$) into freefall, quickly creating an adequate baseline for the system. The RTD ($RTD_1$) receives, tunes, and processes a signal from an RF emitter 50. The signal from RF emitter 50 is also received, tuned, and processed at platform ($P_1$). Using an AOA method, as an example, the azimuth angle relative to the platform can be determined from the RF beam width azimuth 10 (z rotation) and the elevation angle relative to the platform can be determined from the RF beam width elevation 40 (x rotation). The azimuth and elevation angles relative to the RTD are similarly determined at the RTD and this data is transmitted to the platform via, for example, an interferometer signal 30. $RTD_1$ also transmits additional ancillary information (RF emitter signal collection, time of collect, and range support data), to be correlated with the data collected at the primary platform ($P_1$) from the RF emitter 50. This data is collected and processed to determine the ground projected geo-location 20 of RF emitter 50.

An RF emitter for a SAR mission may be, for example, a hand held cell phone. Even where a cell phone may be out of signal reach of a cell phone tower, it can still be used as an RF emitter for an airborne SAR platform to geo-locate using signal triangulation methods.

Figure 3:
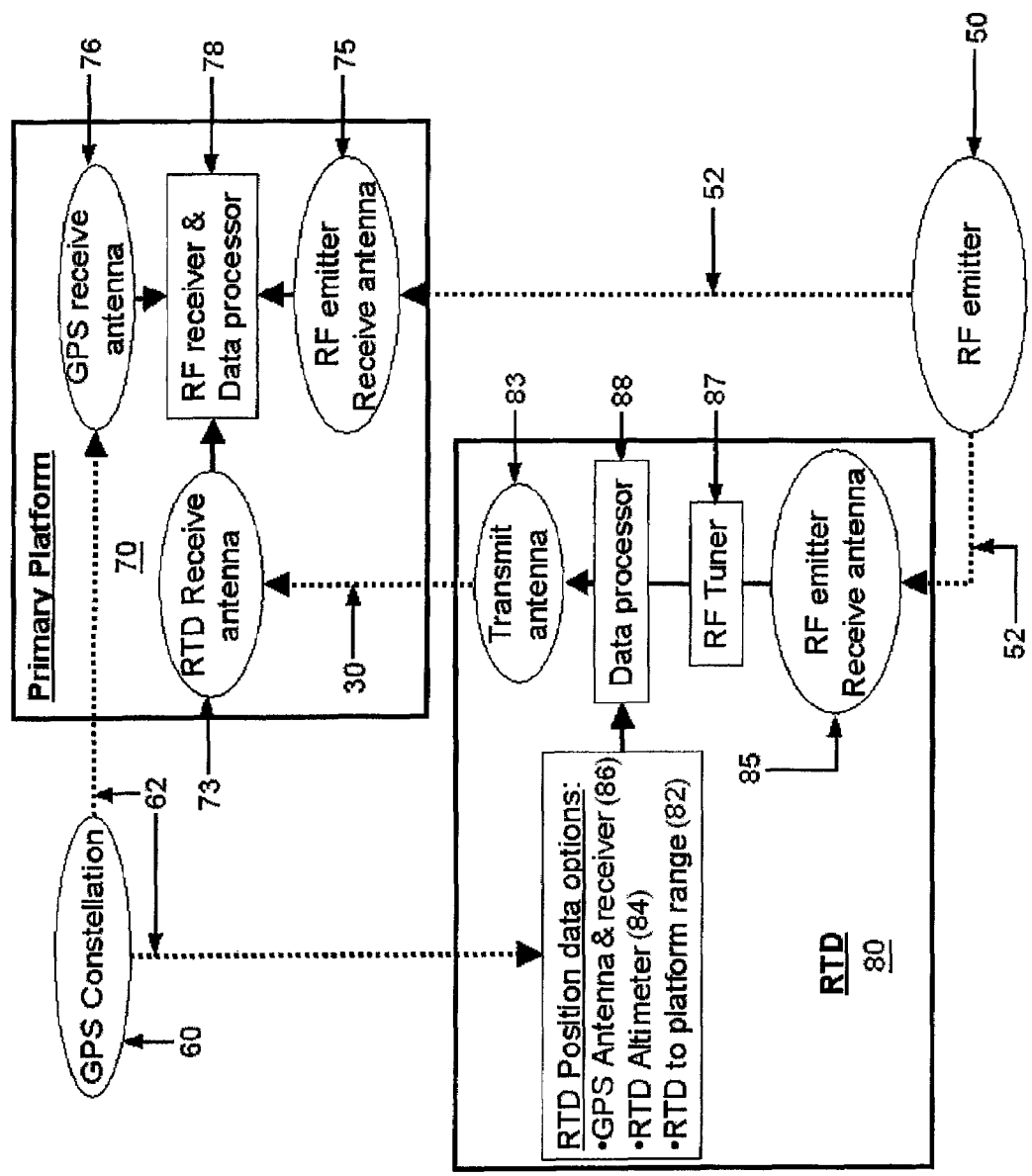
FIG. 3 is a block diagram of the function of a single platform geo-location system and method in accordance with the present disclosure.

FIG. 3 is a block diagram showing the function of another embodiment of the present disclosure. The system according to this embodiment is generally comprised of a primary platform 70 and an RTD 80. The RTD is released from the primary platform to form a baseline for the geo-location system. The RTD has an RF emitter receive antenna 85 for receiving the RF emitter signal 52 from RF emitter 50, an RF tuner 87 for tuning the RF emitter signal, a date processor 88 for processing the signal into data, and a transmit antenna for transmitting the processed data to the primary platform 70. The relative position of the target emitter 50 may be determined using a chosen method such as AOA, TDOA, or FDOA.

The primary platform 70 has an RTD receive antenna 73 for receiving signal 30 from RTD 80, an RF emitter receive antenna 75 for receiving the RF emitter signal 52 from RF emitter 50, and a data processor for processing the signal from the RF emitter and the data received from the RTD via signal 30.

Also shown in FIG. 3, the system is capable of calculating a reference point. Accurate knowledge of the combined azimuth angle, elevation angle, and the ground intercept point is what enables the timely and precise calculation of a relative geo-location using a single primary platform. A relative point of reference may be determined using, for example, a gimbaled antenna on the primary platform for receiving relayed data from the RTD, from which an angle of arrival (AOA) method can be used to determine the RTD position. The gimbaled antenna on the primary platform may further be used in conjunction with an altimeter on the RTD to more accurately determine the RTD's instantaneous position.

FIG. 3 also shows other alternative methods for determining a reference point that may be used in connection with the methods described above. For example, the RTD 80 may include a GPS antenna 86 for receiving a GPS signal 62 from a GPS constellation 60, an altimeter 84, or an RTD-to-platform range detection device 82; wherein the data from these devices is processed by data processor 88 and transmitted to the primary platform 70 as part of signal 30. The GPS antenna and receiver would provide an absolute reference point for the RTD whereas the altimeter 84 or range detection device 82 would provide a relative reference point. The platform 70 may also include a GPS receive antenna 76 for receiving GPS signal 62 from GPS constellation 60, providing an absolute reference point for the platform 70. Alternatively, the absolute point of reference and the relative point of reference are both calculated to further increase the level of accuracy of the system.

As discussed above, prior art single platform solutions, as well as towed and tethered platforms, are limited in their capability to determine the elevation angle. The present disclosure system eliminates this constraint. The large vertical separation between the airborne platform and the released RTD creates a very long RF collection baseline in the vertical direction enabling very accurate elevation angle knowledge of the RF emitter.

Similarly, prior art single platform solutions, particularly towed or tethered platforms, are not suited for using FDOA measurement techniques because the towed or tethered RTD is traveling at the same velocity as the primary platform.

The ability to accurately determine geo-location can also be improved by releasing additional receiver/transmitter devices. The increased number of RTDs increases the number of data points and thus an improved estimate can be made.

In one embodiment, the primary platform is on an airplane. The present disclosure, however, also contemplates the use of helicopters, boats, land vehicles and submarines. In the case of a submarine, a sonar device may be employed as the signal emitter. Accordingly, as used herein the term emitter is also intended to encompass sonar.

The released RTD may be retrievable using, for example, a beacon. The RTD may also be disposable. A disposable RTD may be primarily comprised of biodegradable materials. Alternatively, the disposable RTD may be destroyed using, for example, a small explosive.

It should be emphasized that the above-described embodiments of the present device and process are merely possible examples of implementations and merely set forth for a clear understanding of the principles of the present disclosure. Many different embodiments of the single platform system and method for determining geo-location of an RF emitter described herein may be designed and/or fabricated without departing from the spirit and scope thereof. For instance, the RTD may be released with a small parachute or inflatable balloon to quickly increase the difference in velocity and the distance between the RTD and the primary platform. Alternatively, the RTD may be propelled from the primary platform using a mechanical device or a small cannon. All these and other such modifications and variations are intended to be included herein within the scope of this disclosure and protected by the following claims. Therefore the scope of the disclosure is not intended to be limited except as indicated in the appended claims.

The invention claimed is:

1. A method for determining the geo-location of a target emitter, comprising the steps of
    releasing a receiver/transmitter device (RTD) from a primary platform;
    receiving and processing a signal from the target emitter at the RTD;
    transmitting a processed signal from the RTD to the primary platform;
    calculating a position of the RTD relative to the primary platform;
    receiving and processing the signal from the target emitter at the primary platform; and
    calculating the geo-location of the target emitter.

2. The method of claim 1, wherein the target emitter is a radio frequency (RF) emitter.

3. The method of claim 1, wherein the signal from the target emitter is received and processed at the RTD simultaneous to being received and processed at the primary platform.

4. The method of claim 2, wherein the geo-location of the RF emitter is calculated using an angle-of-arrival method.

5. The method of claim 2, wherein the geo-location of the RF emitter is calculated using a time-difference-of-arrival method.

6. The method of claim 2, wherein the geo-location of the RF emitter is calculated using a frequency-difference-of-arrival method.

7. The method of claim 1, further comprising the step of determining an absolute point of reference.

8. The method of claim 1, wherein the primary platform is located on an airplane or helicopter.

9. The method of claim 1, wherein the primary platform is located on a land vehicle, a boat, or submarine.

10. The method of claim 1, wherein a plurality of RTDs are released from the primary platform.

11. The method of claim 2, wherein the RF emitter is a cell phone.

12. A system for determining the geo-location of a target emitter, comprising
    at least one receiver/transmitter device (RTD) having an antenna for receiving a signal from the target emitter, a tuner for tuning the signal from the target emitter, a processor for processing the signal from the target emitter, and a transmitter for relaying the processed signal; and
    a primary platform having a first antenna for receiving the signal from the target emitter, a tuner for tuning the signal from the target emitter, a second antenna for receiving the processed signal from the at least one RTD, wherein the second antenna of the primary platform is a gimbaled antenna, and a processor for calculating a relative position of the RTD and the geo-location of the target emitter; wherein the at least one RTD is capable of being released from the primary platform.

13. The system of claim 12, wherein the target emitter is a radio frequency (RF) emitter.

14. The system of claim 12, wherein the at least one RTD includes a global positioning system (GPS) antenna.

15. The system of claim 14, wherein the primary platform includes a GPS antenna.

16. The system of claim 12, wherein the primary platform is an airplane or helicopter.

17. The system of claim 12, wherein the primary platform is a land vehicle, a boat or a submarine.

18. The system of claim 12, comprising a plurality of RTD's.

19. The method of claim 1, wherein the position of the RTD relative to the primary platform is calculated using an angle-of-arrival method.

20. The system of claim 12, wherein the at least one RTD further comprises an altimeter.

* * * * *